United States Patent
Ogata et al.

(10) Patent No.: US 12,266,193 B2
(45) Date of Patent: Apr. 1, 2025

(54) DATA COLLECTION APPARATUS, ONBOARD APPARATUS, DATA COLLECTION METHOD, DATA TRANSMISSION METHOD, AND PROGRAM RECORDING MEDIUM

(71) Applicant: NEC Corporation, Tokyo (JP)

(72) Inventors: Kazuki Ogata, Tokyo (JP); Kosei Kobayashi, Tokyo (JP); Kei Yanagisawa, Tokyo (JP); Shintaro Chiku, Tokyo (JP); Yoko Tanaka, Tokyo (JP); Yuki Tsuji, Tokyo (JP); Natsumi Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 18/274,898

(22) PCT Filed: Jan. 29, 2021

(86) PCT No.: PCT/JP2021/003155
§ 371 (c)(1),
(2) Date: Jul. 28, 2023

(87) PCT Pub. No.: WO2022/162856
PCT Pub. Date: Aug. 4, 2022

(65) Prior Publication Data
US 2024/0096110 A1    Mar. 21, 2024

(51) Int. Cl.
*G06V 20/56* (2022.01)
*G06T 7/62* (2017.01)
*G06V 10/74* (2022.01)

(52) U.S. Cl.
CPC .............. *G06V 20/588* (2022.01); *G06T 7/62* (2017.01); *G06V 10/761* (2022.01)

(58) Field of Classification Search
None
See application file for complete search history.

(56) References Cited

U.S. PATENT DOCUMENTS

| 10,596,953 B2 | 3/2020 | Rikimaru |
| 11,265,517 B2 | 3/2022 | Sakurada et al. |
| 2019/0202341 A1 | 7/2019 | Rikimaru |

(Continued)

FOREIGN PATENT DOCUMENTS

| JP | H07-200997 A | 8/1995 | |
| JP | 2003-279661 A | 10/2003 | |
| JP | 2008039687 A * | 2/2008 | ............. G01C 21/00 |

(Continued)

OTHER PUBLICATIONS

International Search Report for PCT Application No. PCT/JP2021/003155, mailed on Apr. 20, 2021.

*Primary Examiner* — Dakshesh D Parikh
(74) *Attorney, Agent, or Firm* — Saghrue Mion, PLLC (57) ABSTRACT

A data collection apparatus, including: a data reception part that receives sensor data from a vehicle capable of photographing a road surface, the sensor data being acquired by a sensor mounted on the vehicle; and a control part that evaluates a goodness degree of a road surface photographing environment on a basis of the sensor data and control a transmission from the vehicle of a road surface photographed image on a basis of the goodness degree of the road surface photographing environment.

12 Claims, 8 Drawing Sheets

(56) References Cited

U.S. PATENT DOCUMENTS

2020/0314389 A1  10/2020  Sakurada et al.

FOREIGN PATENT DOCUMENTS

| JP | 2019-075599 A | 5/2019 |
| JP | 2019-119344 A | 7/2019 |
| JP | 2019-196680 A | 11/2019 |
| JP | 2020-080462 A | 5/2020 |
| JP | 2020-166584 A | 10/2020 |

* cited by examiner

DATA COLLECTION APPARATUS, ONBOARD APPARATUS, DATA COLLECTION METHOD, DATA TRANSMISSION METHOD, AND PROGRAM RECORDING MEDIUM

This application is a National Stage Entry of PCT/JP2021/003155 filed on Jan. 29, 2021, the contents of all of which are incorporated herein by reference, in their entirety.

FIELD

The present invention relates to a data collection apparatus, an onboard apparatus, a data collection method, a data transmission method, and a program recording medium.

BACKGROUND

In recent years, a method for measuring and inspecting road surface conditions using general vehicles have been proposed, in addition to methods using dedicated road surface condition measuring vehicles. For instance, Patent Literature (PTL) 1 discloses an example of a pavement information collection and inspection system that can be implemented with a low capital investment. According to the PTL 1, a pavement information recording device (smartphone) and a video camera record flatness data and a road surface image, respectively, along with latitude and longitude information linked thereto in a recording device. Then, a pavement information collection and inspection service system reads the flatness data, the road surface image, and the latitude and longitude information, linked thereto, recorded in the recording device via an external medium 15a, which is the recording device 15, or via a cable or network connected to the device (refer to Paragraph 0031).

PTL 2 discloses a road surface condition detection method capable of processing an image photographed by a television camera and detecting wet and/or frozen of road surface. Further, it is described that, according to the road surface condition detection method, an added luminance value is calculated in a difference image, where the difference image is obtained by differentiating between images taken before and after a photographed image, and then, when the added luminance value is smaller than a predetermined luminance value, the road surface condition is detected using the above-mentioned photographed image. In addition, as a variant of the above, a method of using the added luminance values in a difference image, where the difference image is obtained by differentiating between the photographed image and a background image without moving objects, is also described. In other words, if the added luminance value is equal to or greater than the predetermined luminance value, the image is excluded from a road surface condition determination processing target, since it is determined that there is high probability that a moving object (vehicle) is photographed in the image (refer to Paragraphs 0028 to 0029).

PTL 1: Japanese Patent Kokai Publication No. JP2019-196680A

PTL 2: Japanese Patent Kokai Publication No. JP2003-279661A

SUMMARY

The following analyses have been made by the present inventors. In the method of PTL 1, an external medium is used to read an image in the recording device 15, however, instead of this method, the image may be transmitted directly from an onboard apparatus or the pavement information recording device (smartphone) to a data collection apparatus.

The images that are photographed on these vehicles, however, are not necessarily photographed in an environment that is suitable for photography. For example, as described in PTL 2, it is difficult to check the road surface condition when other vehicles occupy most of the image. In addition, it is difficult to check the road surface condition when there are puddles of water or snow due to rainfall or snowfall.

Therefore, if the above method of transmitting images directly to the data collection apparatus is used, a large number of images that are not suitable for checking the road surface condition, etc., will be transmitted to the data collection apparatus.

It is an object of the present invention to provide a data collection apparatus, an onboard apparatus, a data collection method, a data transmission method, and a program recording medium that can contribute to suppressing a transmission from the vehicle of the images which are not suitable for checking the above-mentioned road surface condition.

According to a first aspect, there is provided a data collection apparatus including:

a data reception part that receives sensor data from a vehicle capable of photographing a road surface, the sensor data being acquired by a sensor mounted on the vehicle; and a control part that evaluates a goodness degree of a road surface photographing environment on a basis of the sensor data and control a transmission from the vehicle of a road surface photographed image on a basis of the goodness degree of the road surface photographing environment.

According to a second aspect, there is provided an onboard apparatus connected to a camera capable of photographing an image of a road surface, including:

a first transmission part that transmits sensor data for evaluating a goodness degree of a road surface photographing environment to a predetermined data collection apparatus; and a second transmission part that transmits a road surface photographed image on a basis of a response from the predetermined data collection apparatus.

According to a third aspect, there is provided a data collection method including:

receiving sensor data from a vehicle capable of photographing a road surface, the sensor data being acquired by a sensor mounted on the vehicle;

evaluating a goodness degree of a road surface photographing environment on a basis of the sensor data; and controlling a transmission from the vehicle of a road surface photographed image on a basis of the goodness degree of the road surface photographing environment.

The present method is associated with a certain machine referred to as the data collection apparatus that receives images from the vehicle.

According to a fourth aspect, there is provided a data transmission method, including:

transmitting sensor data for evaluating a goodness degree of a road surface photographing environment to a predetermined data collection apparatus by an onboard apparatus connected to a camera capable of photographing an image of a road surface; and transmitting a road surface photographed image on a basis of a response from the predetermined data collection apparatus by the onboard apparatus.

The present method is associated with a certain machine referred to as the onboard apparatus of a vehicle that can photograph the road surface image.

According to a fifth aspect, there is provided computer programs (hereinafter referred to as "programs") for realizing functions of the data collection apparatus above and the onboard apparatus above. These programs are inputted to a computer apparatus via an input device or a communication interface from an outside, are stored in a storage device, and cause a processor to drive in accordance with predetermined steps or processings. These programs can also display, as needed, a processing result including an intermediate state per stage on a display device or communicate with the outside via the communication interface. For example, the computer apparatus for this purpose typically includes a processor, a storage device, an input device, a communication interface, and a display device as needed, which can be connected to each other via a bus. In addition, this program can be a recorded in a computer-readable (non-transitory) storage medium.

According to the present invention, it can contribute to suppressing the transmission from the vehicle of the images which are not suitable for checking the above-mentioned road surface condition.

EXAMPLE EMBODIMENTS

First, an outline of an example embodiment of the present invention will be described with reference to drawings. It should be noted that drawing reference signs in the outline are given to each element for convenience as an example to facilitate understanding and are not intended to limit the present invention to the illustrated modes. Further, connection lines between blocks in the drawings referred to in the following description can be both bidirectional and unidirectional. A unidirectional arrow schematically shows a main flow of a signal (data) and does not exclude bidirectionality. A program is executed by a computer apparatus, and the computer apparatus is provided with, for example, a processor, a storage device, an input device, a communication interface, and a display device as necessary. Further, the computer apparatus is configured to be able to perform wired or wireless communication with an internal device therein or with an external device (including a computer) via the communication interface. In addition, while a port or an interface is present at an input/output connection point of an individual block in the relevant drawings, illustration of the port or the interface is omitted.

Figure 1:
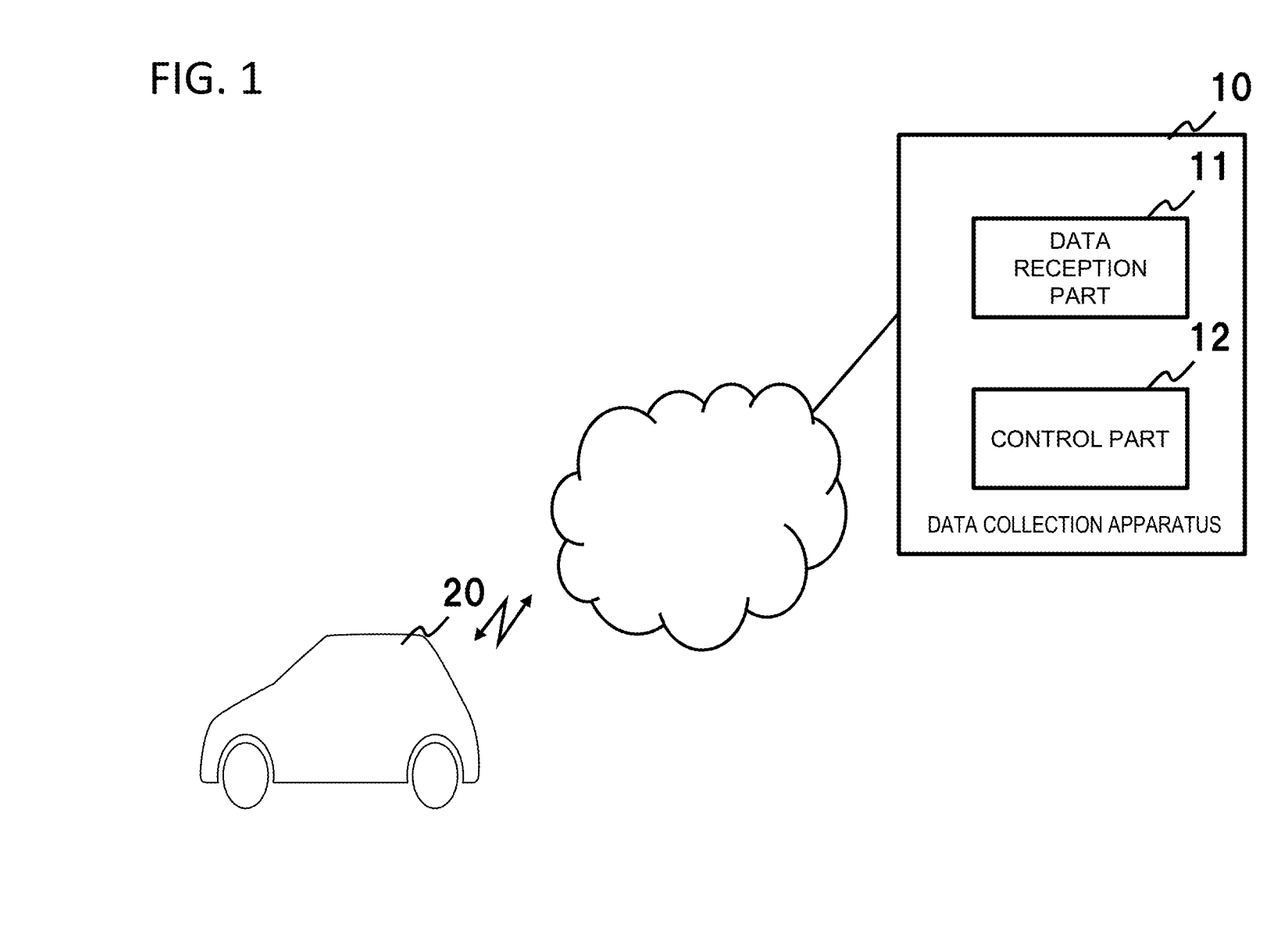
FIG. 1 is a diagram illustrating a configuration of an example embodiment of the present invention.

In one example embodiment, as illustrated in FIG. 1, the present invention can be realized by a configuration including a vehicle 20 capable of photographing a road surface and a data collection apparatus 10. More concretely, the data collection apparatus 10 is provided with a data reception part 11 and a control part 12. The data reception part 11 receives from the vehicle 20 sensor data acquired by a sensor mounted on the vehicle 20. The control part 12 evaluates a degree of goodness (goodness degree) of an environment in which the road surface is photographed (road surface photographing environment) on the basis of the sensor data and controls a transmission from the vehicle 20 of an image in which the road surface is photographed (a road surface photographed image) on the basis of the goodness degree of the road surface photographing environment.

Figure 2:
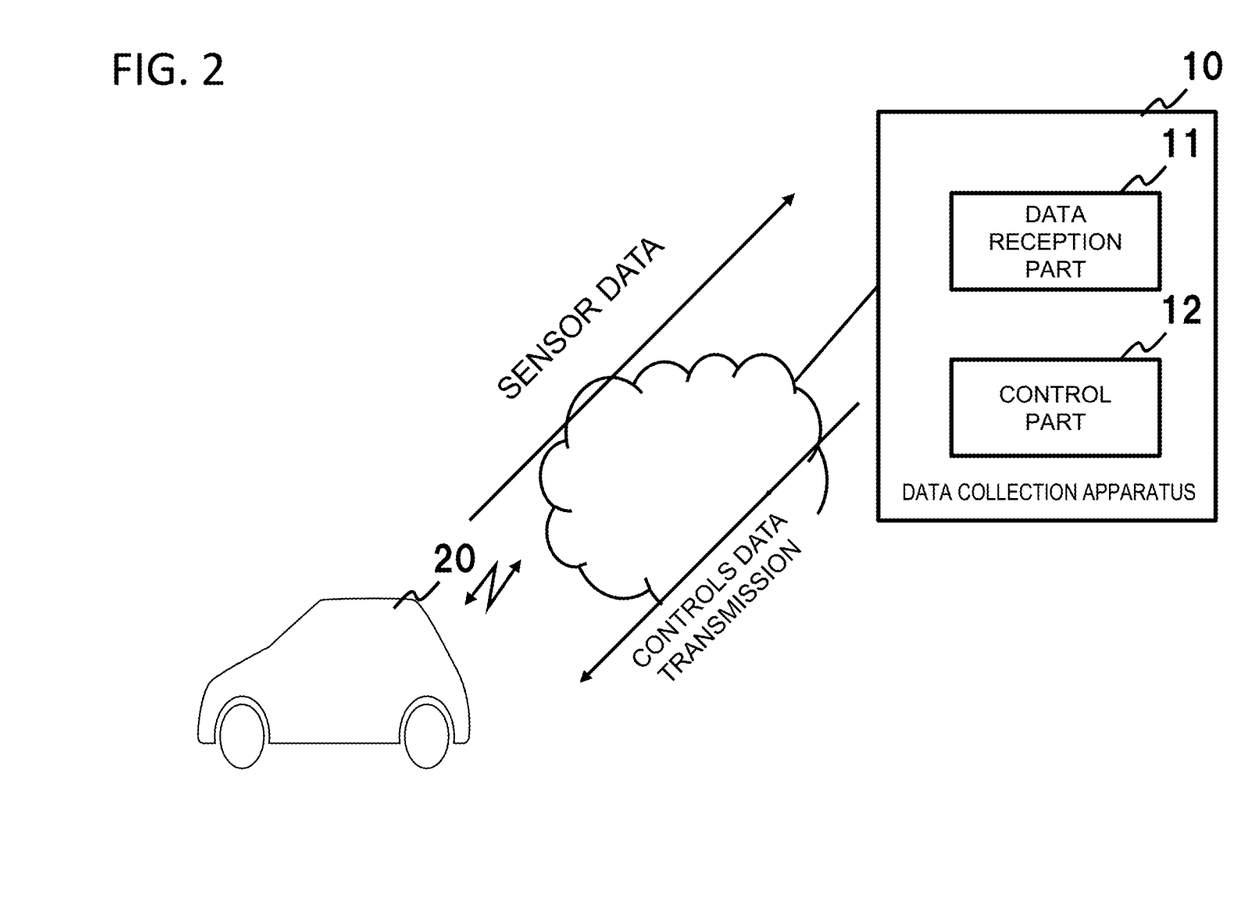
FIG. 2 is a diagram for describing an operation of the example embodiment of the present invention.

As illustrated in FIG. 2, the vehicle 20 records sensor data for evaluating the goodness degree of the road surface photographing environment and transmits it to the data collection apparatus 10. It is preferable that the sensor data is recorded at the same time as or a time point close to the timing of photographing the road surface.

Upon receiving the sensor data, the data collection apparatus 10 evaluates the goodness degree of the road surface photographing environment on the basis of the sensor data. Then, the data collection apparatus 10 controls the transmission from the vehicle 20 of the road surface photographed image on the basis of the goodness degree of the road surface photographing environment. Schemes of controlling the transmission from the vehicle 20 may include a method of instructing the vehicle 20 from the data collection apparatus 10 to suppress the transmission of images, or a method of instructing the vehicle to suppress photographing the road surface.

As described above, according to the present example embodiment, it is possible to suppress the transmission from the vehicle 20 of images that are not suitable for checking the road surface condition. The reason for this is that a configuration is adopted that causes the vehicle to transmit the sensor data prior to transmitting image, and controls the transmission of the image on the basis of a content of the sensor data.

First Example Embodiment

Figure 3:
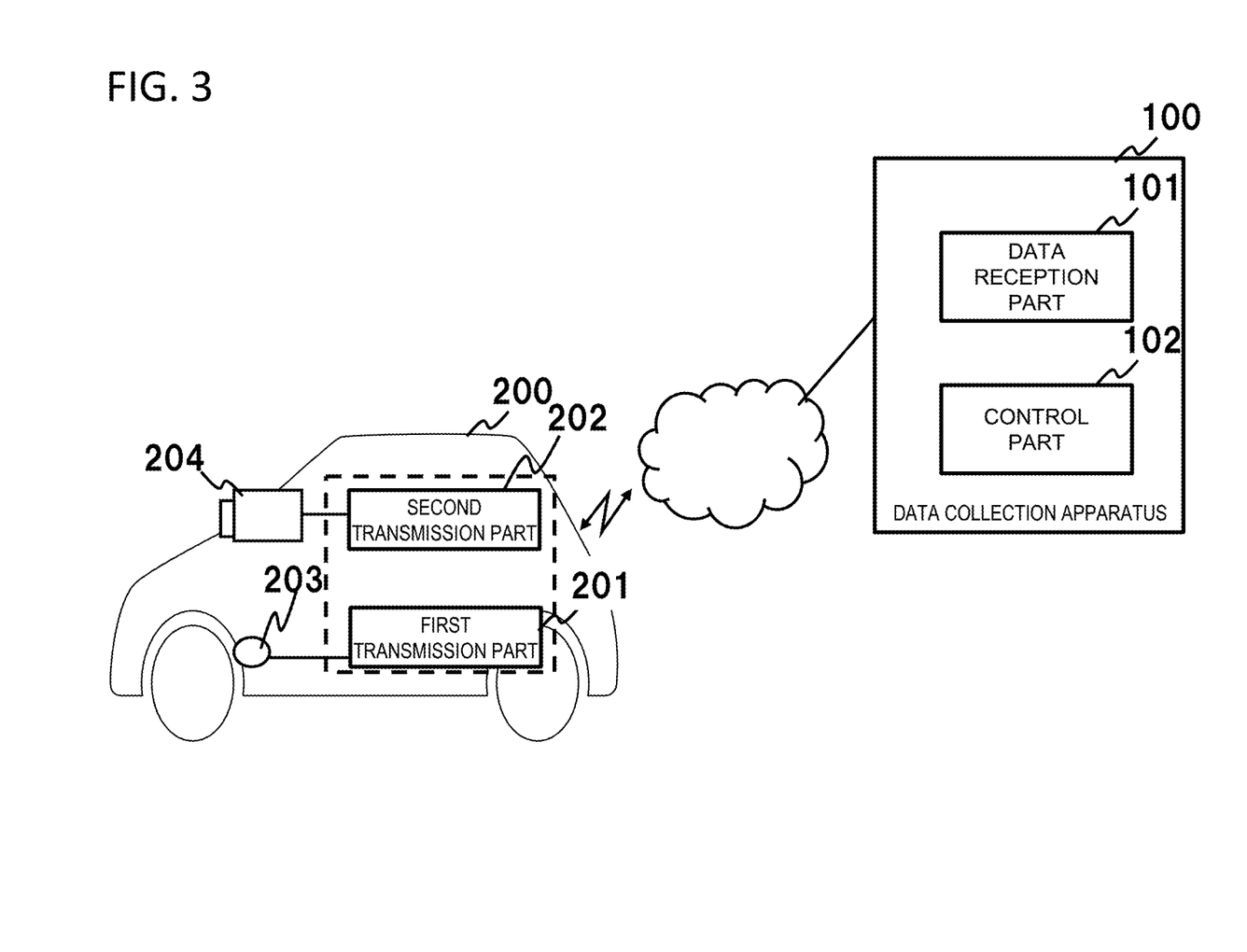
FIG. 3 is a diagram illustrating a configuration of a first example embodiment of the present invention.

A first example embodiment of the present invention will be described in detail with reference to the drawings. FIG. 3 is a diagram illustrating a configuration of the first example embodiment of the present invention. FIG. 3 illustrates a configuration including a data collection apparatus 100 and a vehicle 200 capable of transmitting sensor data and images to the data collection apparatus 100. A scheme of transmitting the sensor data and the images from the vehicle 200 to the data collection apparatus 100 could be performed by a terminal mounted on the vehicle 200 and connected to a wireless communication network provided by a mobile communication carrier. Another scheme of transmitting the sensor data and the images from the vehicle 200 to the data collection apparatus 100 could be via a roadside device located in the vicinity of the road.

The vehicle 200 is provided with a first transmission part 201, a second transmission part 202, a sensor 203, and a camera 204. Note that a broken line in FIG. 3 indicates a functional block of an onboard apparatus.

The first transmission part 201 transmits sensor data acquired by the sensor 203 to the data collection apparatus 100.

The second transmission part 202 transmits an image which the road surface is photographed (a road surface photographed image) to the data collection apparatus 100 on a basis of a response from the data collection apparatus 100.

As to the sensor 203, among various sensors mounted on the vehicle 200, a sensor is selected that can acquire sensor data for evaluating a degree of goodness (goodness degree) of an environment in which the road surface is photographed (road surface photographing environment). Such sensors include those that can detect acceleration, vehicle speed, time, and brightness of surroundings of an imaging device. The brightness of the surroundings of the imaging device (a camera 204) can be detected by a light-receiving sensor used for an automatic lighting function of a vehicle, and can also be detected from an image photographed by the camera 204.

The camera 204 could be a camera that can photograph an image of the road surface. The camera 204 could be a camera dedicated to photographing the road surface, or a camera for a driving recorder and/or automated driving.

The data collection apparatus 100 is provided with a data reception part 101 and a control part 102. The data reception part 101 receives from the vehicle 200 a sensor data acquired by the sensor 203 mounted on the vehicle 200. Upon receiving the sensor data, the data reception part 101 gives the sensor data to the control part 102.

The control part 102 evaluates the goodness degree of the road surface photographing environment on a basis of the sensor data received from the data reception part 101. The goodness degree of the road surface photographing environment can be calculated by setting following evaluation items according to the sensor data, and performing evaluation (or scoring) for each of the evaluation items.

When an acceleration value of the vehicle 200 is large, it is assumed that the vehicle is not running in a stable state. In such a case, the goodness degree of the road surface photographing environment is reduced.

When a speed of the vehicle 200 is excessively high, it is assumed that vibration of a vehicle body will increase, and a camera image will be blurred. In such a case, the goodness degree of the road surface photographing environment is reduced. When a speed of the vehicle 200 is excessively low, it is assumed that there will be an overlap of the road surface photographed in successive camera images. In such a case, the goodness degree of the road surface photographing environment may also be reduced.

The time can be used to determine at least daytime, nighttime, morning, and evening. For nighttime, morning, and evening, the goodness degree of the road surface photographing environment can be reduced. Of course, since the time of sunset and sunrise varies with latitude and longitude and season, these may be taken into consideration in the correction.

Instead of the time above, the control part 102 can also evaluate the goodness degree of the road surface photographing environment using a value directly sensing the brightness of the surroundings of the imaging device (the camera 204). In such a case, in addition to simply reducing the evaluation when it is dark, the control part 102 can reduce the goodness degree of the road surface photographing environment when the surroundings of the imaging device (the camera 204) are too bright. When the surroundings of the imaging device (the camera 204) are too bright, a contrast of an image will be lowered, and in extreme cases, the photographic image will have white areas (blown out highlights) or black crush areas (blocked up shadows). As a result, the goodness degree of the road surface photographing environment will show higher values during cloudy daytime. In addition, the control part 102 may reduce evaluation (or score) of the goodness degree when there is a large contrast in an area that appears to be the road surface due to direct sunlight and strong shadows. This is because, when an image is photographed in such a situation, it is difficult to distinguish between shadow areas caused by direct sunlight and potholes or cracks, and the image is often not suitable for checking the road surface condition.

[Method 1 for Calculating the Goodness Degree of the Road Surface Photographing Environment]

For example, the control part 102 can calculate the goodness degree of the road surface photographing environment by a following formula. For example, when an evaluation item is set to a score of 100 points and a penalty system is used to score the decrease in the goodness degree, the higher the value, the higher the goodness degree of the road surface photographing environment.

the goodness degree of the road surface photographing environment=evaluation value by acceleration+evaluation value by speed+evaluation value by brightness

[Method 2 for Calculating the Goodness Degree of the Road Surface Photographing Environment]

For example, the control part 102 can also calculate the goodness degree of the road surface photographing environment by a following formula. For example, when each evaluation item is given a score of 100 points, and a coefficient is equal to or less than 1, the closer a value is to 100, the higher the goodness degree of the road surface photographing environment.

the goodness degree of the road surface photographing environment=evaluation coefficient by acceleration×score+evaluation coefficient by speed×score+evaluation coefficient by brightness×score.

The method for calculating the goodness degree of the road surface photographing environment is not limited to the above examples, and various modifications can be applied. For example, the above example embodiment is described as using three items of acceleration, speed, and time (brightness of the surroundings of the imaging device), but it is not necessary to use all of these evaluation items. Items other than the above example evaluation items may be added as the evaluation items. As in the second example embodiment below, a distance to a vehicle in front can also be sensed and added to the evaluation items.

A part of calculations and evaluations of the goodness degree of the road surface photographing environment may be performed on the vehicle side. In this case, for example, density (or darkness degree), number and size of shadow areas in the image photographed by the camera 204 can be added to the evaluation items. This is because these shadow areas in the image often appear as the number of black crushed areas in the image, making the image unsuitable for checking the road surface condition. The distance to the vehicle in front may be added to the evaluation items and an evaluation can be performed on the vehicle side. As a result of the above evaluation, the control part 102 may exclude from sensor data to be transmitted to the data collection apparatus 100 those that the evaluation of the goodness degree of the road surface photographing environment is low. In this way, sensor data in the data collection apparatus 100 can be reduced.

The control part 102 controls a transmission from the vehicle of an image that a road surface is photographed (a road surface photographed image) on a basis of the goodness degree of the road surface photographing environment that has been evaluated as described above. In the present example embodiment, the control part 102 determines whether or not to request the vehicle 200 to transmit the road surface photographed image, according to whether or not the goodness degree of the road surface photographing environment evaluated as described above is equal to or greater than a predetermined threshold value. For example, when the goodness degree of the road surface photographing environment is equal to or greater than the predetermined threshold value, the control part 102 requests the vehicle 200 to transmit the road surface photographed image. Then, the second transmission part 202 of the vehicle 200 transmits the road surface photographed image to the data collection apparatus 100. On the contrary, when the goodness degree of the road surface photographing environment is less than the predetermined threshold value, the control part 102 does not request the vehicle 200 to transmit the road surface photographed image. This suppresses the transmission of images from the vehicle 200 to the data collection apparatus 100.

Analysis of the image received from the vehicle 200 may be performed by the data collection apparatus 100, or may cause another road surface image analyzer to perform.

Figure 4:
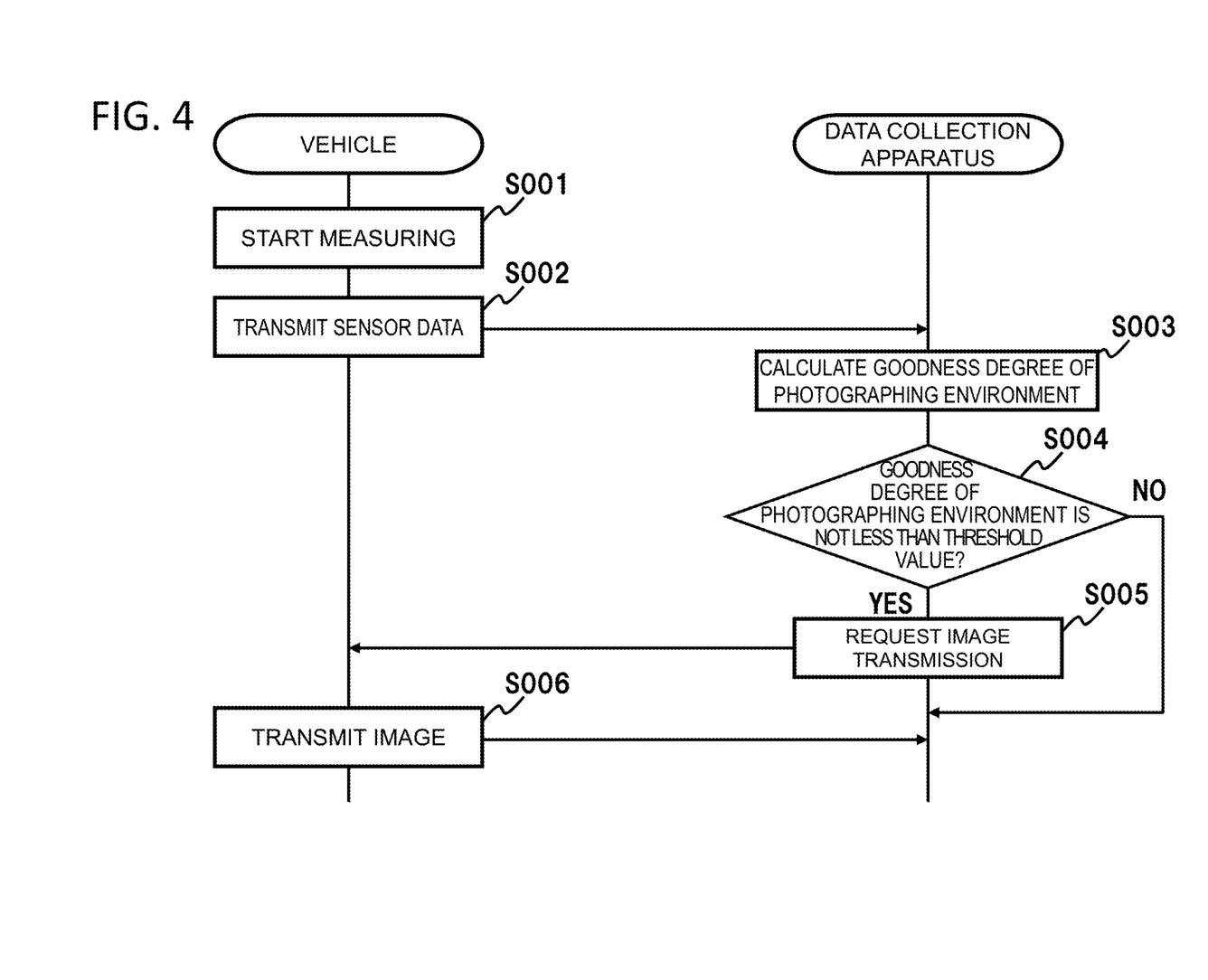
FIG. 4 is a sequence diagram illustrating an operation of the first example embodiment of the present invention.

Next, an operation of the present example embodiment will be described in detail with reference to a drawing. FIG. 4 is a sequence diagram illustrating the operation of the first example embodiment of the present invention. With reference to FIG. 4, the vehicle 200 first performs measurement using the sensor 203 corresponding to the evaluation items described above (step S001). Note that, if the sensor 203 is constantly operating in the vehicle 200, the step S001 may be omitted.

Next, the vehicle 200 transmits the measured sensor data to the data collection apparatus 100 (step S002). When transmitting sensor data for a plurality of evaluation items, they may be transmitted individually in sequence or collectively using a predetermined format.

Upon receiving the sensor data, the data collection apparatus 100 calculates the goodness degree of the photographing environment (step S003).

Then, the data collection apparatus 100 compares the calculated goodness degree of the photographing environment with a predetermined threshold value (step S004). If, as a result of the comparison, the calculated goodness degree of the photographing environment is not less than the predetermined threshold value (Yes in step S004), the data collection apparatus 100 requests the vehicle 200 to transmit a road surface photographed image (step S005).

The vehicle 200, which has received a request to transmit the road surface photographed image, transmits the road surface photographed image to the data collection apparatus 100 (step S006). If the calculated goodness degree of the photographing environment is less than the predetermined threshold value in step S004 (No in step S004), no request for the road surface photographed image is made.

As described above, according to the present example embodiment, it becomes possible to suppress the transmission from the vehicle 200 of an image that is not suitable for checking the road surface condition. The reason for this is that a system according to the present example embodiment employs a configuration in which the goodness degree of the photographing environment of the camera 204 on the vehicle 200 is evaluated on the basis of the sensor data received from the vehicle 200, and on the basis of the results, the transmission of the image is suppressed.

Second Example Embodiment

Figure 5:
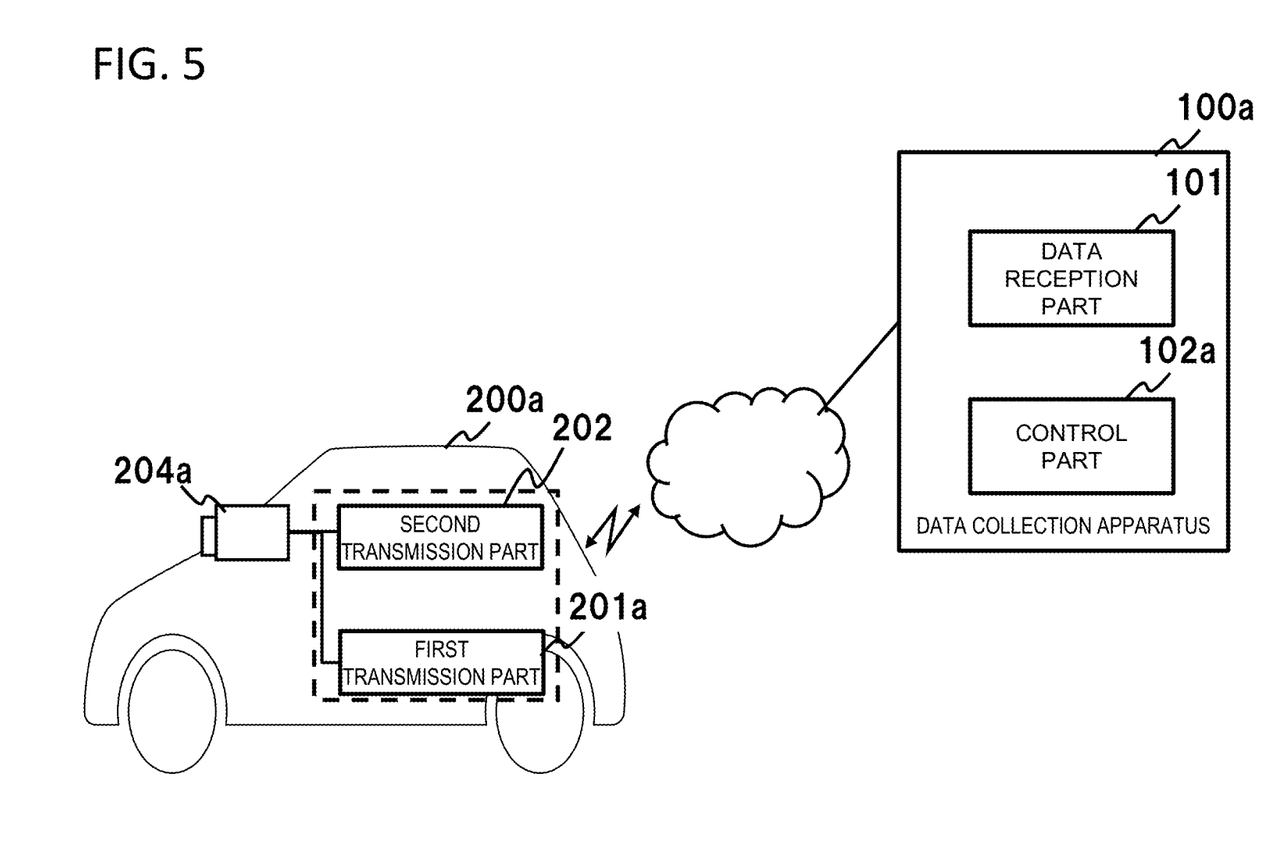
FIG. 5 is a diagram illustrating a configuration of a second example embodiment of the present invention.

A second example embodiment of the present invention, in which an image photographed by the camera 204 is used as sensor data, will be described. FIG. 5 is a diagram illustrating a configuration of the second example embodiment of the present invention. The difference in configuration from the first example embodiment illustrated in FIG. 3 is that a first transmission part 201a of a vehicle 200a can acquire images from a camera 204a. Since the other configuration is almost the same as the first example embodiment, the following explanation will focus on the difference.

The first transmission part 201a creates a digest image using an image photographed by the camera 204a and transmits it to the data collection apparatus 100a. For example, as the digest image, a partially cropped image from the image photographed by the camera 204a or an image with a reduced pixel number from the image photographed by the camera 204a can be used.

A control part 102a evaluates the goodness degree of the road surface photographing environment on a basis of the digest image received from the vehicle 200a via the data reception part 101. In the present example embodiment, since the digest image is received as a sensor data, the control part 102a can evaluate the goodness degree of the road surface photographing environment using the digest image.

Figure 6A:
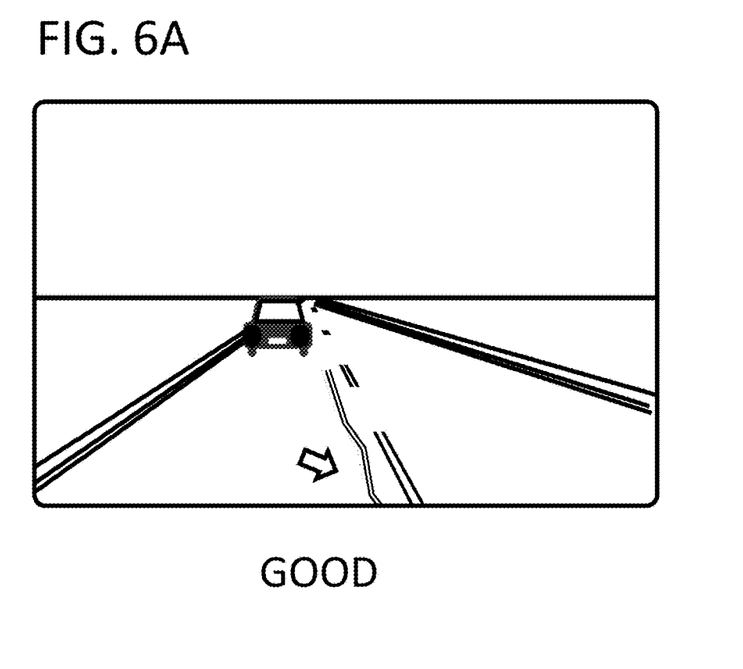
FIG. 6A is a diagram for describing an operation of a data collection apparatus of the second example embodiment of the present invention.
Figure 6B:
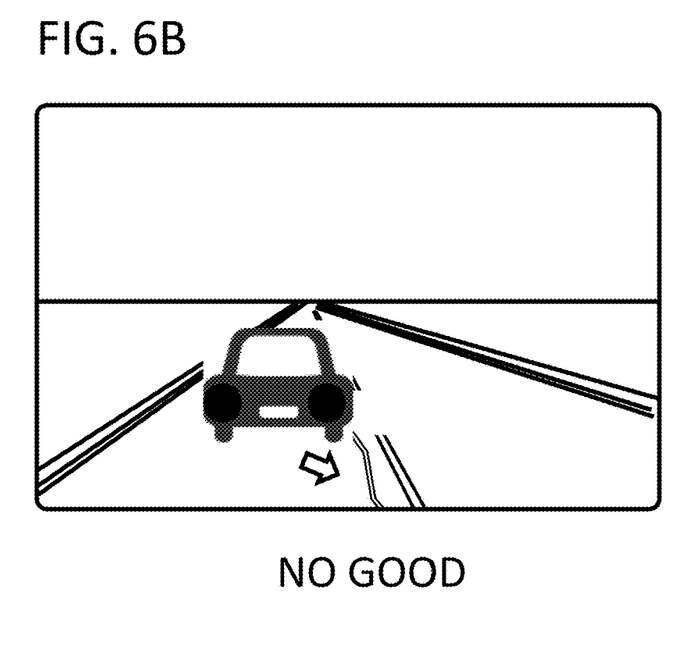
FIG. 6B is a diagram for describing an operation of a data collection apparatus of the second example embodiment of the present invention.

FIG. 6A and FIG. 6B are diagrams illustrating an example of a method for evaluating the goodness degree of the road surface photographing environment using the digest image. FIG. 6A, shown as GOOD, illustrates an example of a digest image of which the goodness degree of the road surface photographing environment is evaluated to be high. FIG. 6B, shown as NO GOOD, illustrates an example of a digest image of which the goodness degree of the road surface photographing environment is evaluated to be low. The reason why FIG. 6B, shown as NO GOOD, is evaluated to be low is that an image of a preceding vehicle (a vehicle in front) is large in the digest image, and a crack existing on the road surface in a center of the digest image is hidden. On the contrary, in FIG. 6A, shown as GOOD, a sufficient following distance is maintained between the preceding vehicle (the vehicle in front) and an own vehicle, and the crack existing on the road surface in the center of the digest image is properly photographed. In this case, the goodness degree of the road surface photographing environment is evaluated to be high.

The control part 102a according to the present example embodiment estimates a distance between the own vehicle and the preceding vehicle on the basis of a size of the image area of the preceding vehicle in the digest image, and uses the distance to evaluate the goodness degree of the road surface photographing environment. For example, when the size of the image area of the preceding vehicle in the digest image is equal to or larger than a predetermined value, the distance between the own vehicle and the preceding vehicle (the vehicle in front) is short. In this case, the control part 102a determines that the goodness degree of the road surface photographing environment is low and does not request the vehicle 200 to transmit the road surface photographed image. On the contrary, when the size of the image area of the preceding vehicle in the digest image is smaller than the predetermined value, the distance between the own vehicle and the preceding vehicle (the vehicle in front) is sufficiently maintained. In this case, the control part 102a determines that the goodness degree of the road surface photographing environment is high and requests the vehicle 200 to transmit the road surface photographed image.

Figure 7:
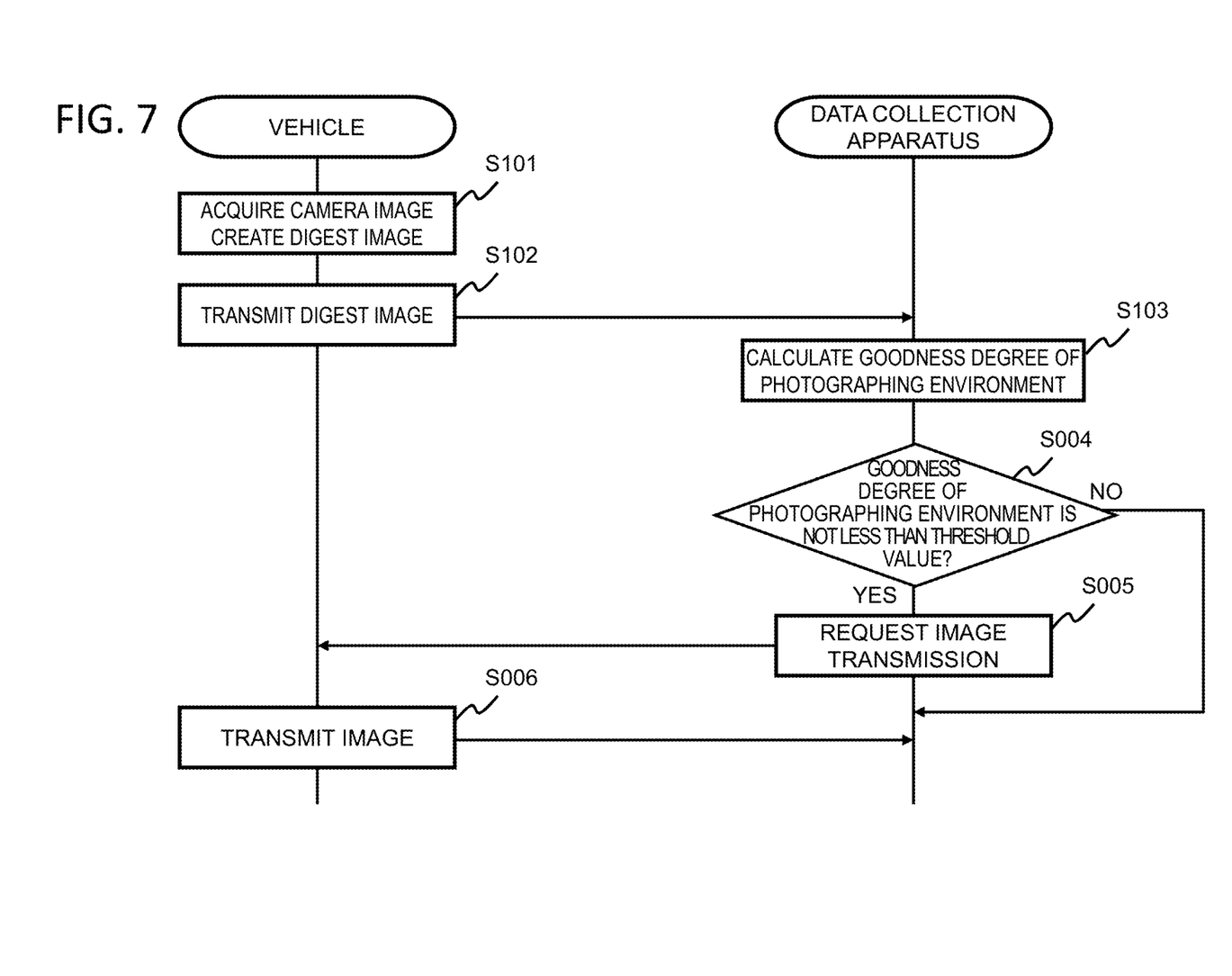
FIG. 7 is a sequence diagram illustrating an operation of the second example embodiment of the present invention.

Next, an operation of the present example embodiment will be described in detail with reference to a drawing. FIG. 7 is a sequence diagram illustrating the operation of the second example embodiment of the present invention. The difference in operation from the first example embodiment illustrated in FIG. 4 is that an evaluation of the goodness degree of the road surface photographing environment based on the above digest image is performed in steps S101 to S103.

With reference to FIG. 7, the vehicle 200a first acquires an image from the camera 204a and creates a digest image therefrom (step S101). In addition to the digest image, the vehicle 200a may obtain sensor data from a sensor 203 as in the first example embodiment.

Next, the vehicle 200a transmits the created digest image to the data collection apparatus 100a (step S102). As in the first example embodiment, in case where the vehicle 200a obtains sensor data from the sensor 203, the vehicle 200a may transmit the sensor data to the data collection apparatus 100a.

Upon receiving the digest image, the data collection apparatus 100a calculates the goodness degree of the photographing environment using the digest image (step S103). In the present example embodiment, the data collection apparatus 100a evaluates the goodness degree of the road surface photographing environment on the basis of a size of the image area of the preceding vehicle in the digest image.

For example, when the digest image such as GOOD in FIG. 6A is obtained (Yes in step S004), the data collection apparatus 100a requests the vehicle 200a to transmit the road surface photographed image (step S005).

On the contrary, when the digest image such as NO GOOD in FIG. 6B is obtained (No in step S004), the data collection apparatus 100a does not request the vehicle 200a to transmit the road surface photographed image.

As described above, also according to the present example embodiment, it becomes possible to suppress the transmission from the vehicle 200a of an image that is not suitable for checking the road surface condition. The reason for this is that a system according to the present example embodiment employs a configuration in which the goodness degree of the photographing environment of the camera 204a on the vehicle 200a is evaluated on the basis of the digest image received from the vehicle 200a, and on the basis of the results, the transmission of the image is suppressed.

In the above example embodiment, it is described that the vehicle 200a creates a digest image of an image photographed by the camera 204a, however, if a resolution of the image photographed by the camera 204a is originally low, a creation of the digest image can be omitted. In this case, the data collection apparatus 100 uses the image photographed by the camera 204a as it is to evaluate the goodness degree of the photographing environment.

In this case, the data collection apparatus 100a may request vehicle 200a to transmit an image with a higher resolution or an image before or after the transmitted image.

It has been described that the data collection apparatus 100a evaluates the goodness degree of the photographing environment of the camera 204a on the vehicle 200a on the basis of the digest image received from the vehicle, however, the data collection apparatus 100a can also perform a similar control using information other than the digest image. For example, if the vehicle 200a is provided with a distance sensor, which measures a distance between the own vehicle and a preceding vehicle (a vehicle in front), it is possible to adopt a configuration that the data collection apparatus 100a evaluates the goodness degree of the photographing environment of the camera 204a on the vehicle 200a using the measured distance data. As such a ranging sensor (or a distance measurement sensor), a sensor using optical method such as LiDAR (Light Detection and Ranging), as well as a ranging sensor using a radio wave or an ultrasonic wave can be used.

While example embodiments of the present invention have thus been described, the present invention is not limited thereto. Further variations, substitutions, or adjustments can be made without departing from a basic technical concept of the present invention. For example, the configurations of the networks, the configurations of the elements, and the representation modes of the data illustrated in the drawings have been used only as examples to facilitate understanding of the present invention. That is, the present invention is not limited to the configurations illustrated in the drawings.

For example, in the above embodiments, it is described that the data collection apparatus 100 or 100a evaluates the goodness degree of the photographing environment. However, the vehicle 200 and 200a may also have the same functionality. In this way, it is possible to at least partially suppress the transmission of sensor data and/or digest images when the vehicle 200 or 200a is clearly aware that the photographic environment is in a poor condition.

In the second example embodiment above, it is described that the vehicle 200a creates the digest image and transmits it to the data collection apparatus 100a. However, if a resolution of an image photographed by the camera 204a is low, the image photographed by the camera 204a may be transmitted as it is to the data collection apparatus 100a. In this case, the data collection apparatus 100a may instruct the vehicle 200a to increase the resolution of the image to be photographed by the camera 204a. Thus, the same effect as in the second example embodiment can be achieved.

Figure 8:
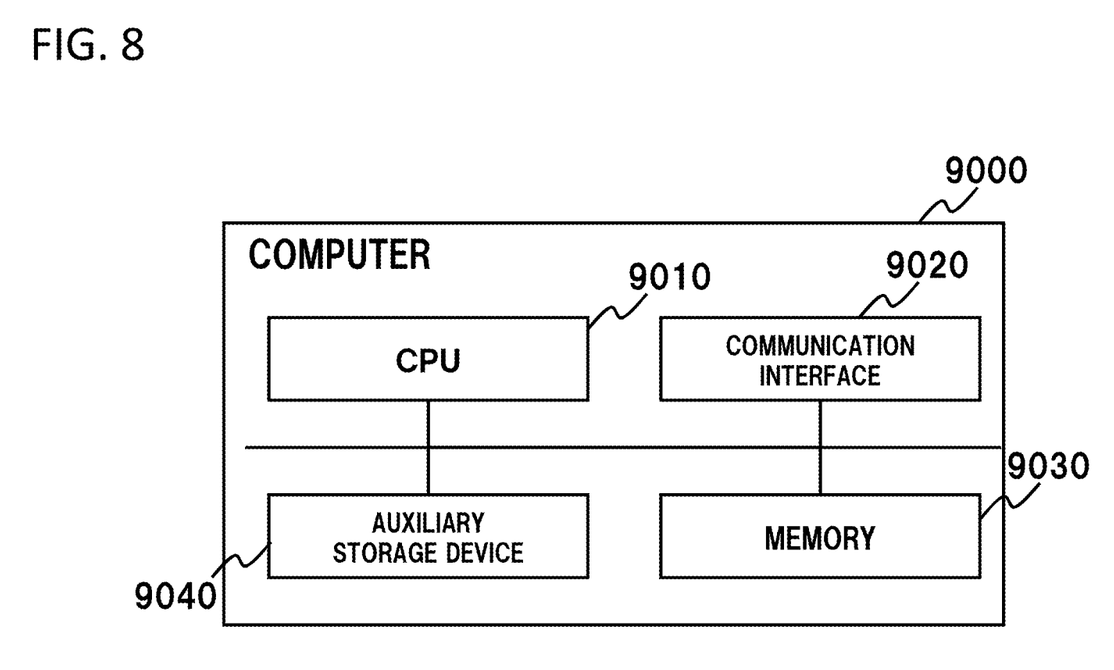
FIG. 8 is a diagram illustrating a configuration of a computer installed on a measurement vehicle of the present invention.

Each of the procedures described in the first and second example embodiments above can be realized by a program that causes a computer (9000 in FIG. 8), which functions as an onboard apparatus of the data collection apparatus and/or the vehicle, to realize the function as each apparatus. This computer is exemplified in FIG. 8 in a configuration with a CPU (Central Processing Unit) 9010, a communication interface 9020, a memory 9030, and an auxiliary storage device 9040. That is, the CPU 9010 in FIG. 8 performs a calculation program for the goodness degree of the photographing environment and/or a transmission control program of images and performs processing for updating various calculation parameters stored in the auxiliary storage device 9040, etc.

That is, each part (processing means and functions) of each device illustrated in the first and second example embodiments above can be realized by a computer program that causes the processor in these devices to execute each of the above processes using its hardware.

Finally, suitable modes of the present invention will be summarized. The whole part of the example embodiments disclosed above can be described as, but not limited to, the following supplementary notes termed as "Modes".

[Mode 1]
(See the data collection apparatus according to the above first aspect)

[Mode 2]
In the above data collection apparatus, the control part can be configured to request the vehicle to transmit the road surface photographed image, if the goodness degree of the road surface photographing environment is not less than a predetermined threshold value.

[Mode 3]
In the above data collection apparatus, the control part can be configured to request the vehicle to suppress a transmission of the road surface photographed image, if the goodness degree of the road surface photographing environment is less than the redetermined threshold value.

[Mode 4]
In the above data collection apparatus,
the data reception part can be configured to receive information on a distance between the vehicle and a preceding vehicle that is running in front of the vehicle as the sensor data, and
the control part can be configured to evaluate the goodness degree of the road surface photographing environment using the information on the distance between the vehicle and the preceding vehicle.

[Mode 5]
In the above data collection apparatus,
the data reception part can be configured to receive a digest image created from the road surface photographed image as the sensor data, and
the control part can be configured to estimate the distance between the vehicle and the preceding vehicle on a basis of a size of an image of the preceding vehicle in the digest image.

[Mode 6]
In the above data collection apparatus,
the data reception part can be configured to receive at least a portion of the road surface photographed image as the sensor data, and
the control part can be configured to evaluate the goodness degree of the road surface photographing environment according to whether or not a road surface in the road surface photographed image includes a puddle or a shadow.

[Mode 7]
In the above data collection apparatus,
the data reception part can be configured to receive as a sensor data at least one of acceleration information, speed information and time information of the vehicle, and brightness information of surroundings of an imaging device, and
the control part evaluates the goodness degree of the road surface photographing environment of the imaging device on a basis of at least one of acceleration information, speed information and time information of the vehicle and brightness information of surroundings of the imaging device.

[Mode 8]
(See the onboard apparatus according to the above second aspect)

[Mode 9]
(See the data collection method according to the above third aspect)

[Mode 10]
(See the data transmission method according to the above fourth aspect)

[Mode 11]
(See the programs according to the above fifth aspect)

The above modes 8 to 11 can be expanded in the same way as mode 1 is expanded to modes 2 to 7.

The disclosure of each of the above Patent Literatures is incorporated herein by reference thereto and may be used as the basis or a part of the present invention, as needed. Modifications and adjustments of the example embodiments and examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST

10,100,100a: data collection apparatus
20,200,200a: vehicle
11,101: data reception part
12,102,102a: control part
201,201a: first transmission part
202: second transmission part
203: sensor
204,204a: camera
9000: computer
9010: CPU
9020: communication interface
9030: memory
9040: auxiliary storage device

What is claimed is:

1. A data collection apparatus, comprising:
at least one memory configured to store instructions; and
at least one processor configured to execute the instructions to:
receive sensor data from a vehicle capable of photographing a road surface, the sensor data being acquired by a sensor mounted on the vehicle;
evaluate a goodness degree of a road surface photographing environment on a basis of the sensor data and control a transmission from the vehicle of a road surface photographed image on a basis of the goodness degree of the road surface photographing environment;
receive information on a distance between the vehicle and a preceding vehicle that is running in front of the vehicle as the sensor data;
evaluate the goodness degree of the road surface photographing environment using the information on the distance between the vehicle and the preceding vehicle;
receive a digest image created from the road surface photographed image as the sensor data; and estimate the distance between the vehicle and the preceding vehicle on a basis of a size of an image of the preceding vehicle in the digest image.

2. The data collection apparatus according to claim 1, wherein the processor is configured to execute the instructions to request the vehicle to transmit the road surface photographed image, if the goodness degree of the road surface photographing environment is not less than a predetermined threshold value.

3. The data collection apparatus according to claim 1, wherein the processor is configured to execute the instructions to request the vehicle to suppress a transmission of the road surface photographed image, if the goodness degree of the road surface photographing environment is less than the redetermined threshold value.

4. The data collection apparatus according to claim 1, wherein the processor is configured to execute the instructions to:
receive at least a portion of the road surface photographed image as the sensor data; and
evaluate the goodness degree of the road surface photographing environment according to whether or not a road surface in the road surface photographed image includes a puddle or a shadow.

5. The data collection apparatus according to claim 1, wherein the processor is configured to execute the instructions to:
receive as a sensor data at least one of acceleration information, speed information and time information of the vehicle, and brightness information of surroundings of an imaging device; and
evaluate the goodness degree of the road surface photographing environment of the imaging device on a basis of at least one of acceleration information, speed information and time information of the vehicle and brightness information of surroundings of the imaging device.

6. An onboard apparatus connected to a camera capable of photographing an image of a road surface, the onboard apparatus comprising:
at least one memory configured to store instructions; and
at least one processor configured to execute the instructions to:
transmit sensor data for evaluating a goodness degree of a road surface photographing environment to a predetermined data collection apparatus;
transmit a road surface photographed image on a basis of a response from the predetermined data collection apparatus;
transmit information on a distance between the vehicle and a preceding vehicle that is running in front of the vehicle as the sensor data; and
transmit a digest image created from the road surface photographed image as the sensor data;
wherein the predetermined data collection apparatus is configured to evaluate the goodness degree of the road surface photographing environment using the information on the distance between the vehicle and the preceding vehicle, and
wherein the predetermined data collection apparatus is configured to estimate the distance between the vehicle and the preceding vehicle on a basis of a size of an image of the preceding vehicle in the digest image.

7. A data collection method, comprising:
receiving sensor data from a vehicle capable of photographing a road surface, the sensor data being acquired by a sensor mounted on the vehicle;
evaluating a goodness degree of a road surface photographing environment on a basis of the sensor data;
controlling a transmission from the vehicle of a road surface photographed image on a basis of the goodness degree of the road surface photographing environment;
receiving information on a distance between the vehicle and a preceding vehicle that is running in front of the vehicle as the sensor data;
evaluating the goodness degree of the road surface photographing environment using the information on the distance between the vehicle and the preceding vehicle;
receiving a digest image created from the road surface photographed image as the sensor data; and
estimating the distance between the vehicle and the preceding vehicle on a basis of a size of an image of the preceding vehicle in the digest image.

8. The data collection apparatus according to claim 2, wherein the processor is configured to execute the instructions to:
receive at least a portion of the road surface photographed image as the sensor data; and
evaluate the goodness degree of the road surface photographing environment according to whether or not a road surface in the road surface photographed image includes a puddle or a shadow.

9. The data collection apparatus according to claim 3, wherein the processor is configured to execute the instructions to:
receive at least a portion of the road surface photographed image as the sensor data; and
evaluate the goodness degree of the road surface photographing environment according to whether or not a road surface in the road surface photographed image includes a puddle or a shadow.

10. The data collection apparatus according to claim 1, wherein the processor is configured to execute the instructions to:
receive at least a portion of the road surface photographed image as the sensor data; and
evaluate the goodness degree of the road surface photographing environment according to whether or not a road surface in the road surface photographed image includes a puddle or a shadow.

11. The data collection apparatus according to claim 2, wherein
the processor is configured to execute the instructions to:
receive as a sensor data at least one of acceleration information, speed information and time information of the vehicle, and brightness information of surroundings of an imaging device; and
evaluate the goodness degree of the road surface photographing environment of the imaging device on a basis of at least one of acceleration information, speed information and time information of the vehicle and brightness information of surroundings of the imaging device.

12. The data collection apparatus according to claim 3, wherein the processor is configured to execute the instructions to:
receive as a sensor data at least one of acceleration information, speed information and time information of the vehicle, and brightness information of surroundings of an imaging device; and
evaluate the goodness degree of the road surface photographing environment of the imaging device on a basis of at least one of acceleration information, speed information and time information of the vehicle and brightness information of surroundings of the imaging device.

\* \* \* \* \*